United States Patent [19]

Caccavale

[11] Patent Number: 5,459,837

[45] Date of Patent: Oct. 17, 1995

[54] SYSTEM TO FACILITATE EFFICIENT UTILIZATION OF NETWORK RESOURCES IN A COMPUTER NETWORK

[75] Inventor: Frank S. Caccavale, Holliston, Mass.

[73] Assignee: Digital Equipment Corporation, Maynard, Mass.

[21] Appl. No.: 50,929

[22] Filed: Apr. 21, 1993

[51] Int. Cl.⁶ .................................................... G06F 11/34
[52] U.S. Cl. ................................ 395/184.01; 395/200.01; 364/DIG. 1; 364/264.5; 364/285; 364/267.9; 364/551.01; 371/20.1; 371/62
[58] Field of Search ........................... 395/200, 575; 371/60, 62, 16.3, 20.1; 364/551.01

[56] References Cited

U.S. PATENT DOCUMENTS

| | | | |
|---|---|---|---|
| 4,750,175 | 6/1988 | Brenneman et al. | 371/22 |
| 4,821,178 | 4/1989 | Levin et al. | 395/575 |
| 4,890,227 | 12/1989 | Watanabe et al. | 395/800 |
| 4,905,171 | 2/1990 | Kiel et al. | 364/551.01 |
| 4,930,093 | 5/1990 | Houser et al. | 364/551.01 |
| 5,067,099 | 11/1991 | McCown et al. | 364/550 |
| 5,067,107 | 11/1991 | Wade | 395/500 |
| 5,109,350 | 4/1992 | Henwood et al. | 364/550 |
| 5,197,127 | 3/1993 | Waclawsky et al. | 395/200 |
| 5,331,574 | 7/1994 | Temoshenko et al. | 364/551.01 |
| 5,339,430 | 8/1994 | Lundin et al. | 395/700 |
| 5,375,206 | 12/1994 | Hunter et al. | 395/200 |

*Primary Examiner*—Krisna Lim
*Attorney, Agent, or Firm*—Kenneth F. Kozik

[57] ABSTRACT

In a method and system for monitoring the performance of servers across a network and for suggesting an appropriate server to a client requesting a service, a plurality of probes are placed in various clients in the network by a Broker-Performance Mechanism. The probes request that the servers perform various network functions and measure the response times of the servers in satisfying those requests. The Broker-Performance Mechanism retrieves, analyzes, and stores the response time data. The stored data can be made available to a user for system diagnostic purposes. In addition, when a particular client requests a particular service, the Broker-Performance Mechanism examines the analyzed data and determines which server is best suited, at that particular time, to provide the requested service to the requesting client.

11 Claims, 9 Drawing Sheets

```
FOR OPERATION "0"

GET_RESPONSETIME_"0" ()
        {
        FOR (x=0: x < x + +) {
            WAIT_A_RANDOM_TIMER ();
            TIME (s) = BUNCH_OF_"0" ();
        }
        GET_RESPONSE_TIME_FOR_"0" ();/*PUT TIMES INTO
                                              APPROPRIATE
                                              DATA BASE
                                              ENTRIES */
        }
    BUNCH_OF_"0" ()
        }
        TIMESTAMP1 ();
        FOR (x=)=:x<x + +)
                PERFORM "0";
        TIMESTAMP 2 ();
        TIMES = TIMESTAMP2 -TIMESTAMP1;
        RETURN (TIME);
        }
```

*Fig. 2*

| PROBE 1 | $RT_{1,i}$ | $RT_{2,i}$ | $RT_{3,i}$ | $RT_{6,i}$ |
|---|---|---|---|---|
| OPERATION A | 10ms | 12ms | 11ms | ... |
| B | 15 | 16 | 15 | |
| C | 30 | 29 | 32 | |
| DEGRADATION | | $D_1$ | $D_2$ | .. $D_5$ |
| A | | +20% | -8% | .. |
| B | | +7% | -6% | |
| C | | -4% | +10% | |
| $CD_1$ - $CD_5$ | | +7.7% | -1.3% | |

$X_{avg,1}$ $\dfrac{CD_1 + CD_2 + CD_3 + CD_4 + CD_5}{5}$ $S_2$ = STANDARD DEVIATION OF $CD_1$ - $CD_5$

| PROBE 2 | $RT_{1,i}$ | $RT_{2,i}$ | $RT_{3,i}$ | $RT_{6,i}$ |
|---|---|---|---|---|
| OPERATION A | 10ms | 12ms | 14ms | ... |
| B | 18 | 17 | 18 | |
| C | 25 | 25 | 28 | |
| DEGRADATION | | $D_1$ | $D_2$ | .. $D_5$ |
| A | | 0% | +17% | |
| B | | -6% | +5% | |
| C | | 0% | +16% | |
| $CD_1$ - $CD_5$ | | -2% | +12.7% | |

$X_{avg,2}$ =

PROBE 3

| OPERATION | RT1,i 9ms | RT2,i 9ms | RT3,i 17ms | ... | RT6,i |
|---|---|---|---|---|---|
| A | 17 | 16 | 17 | | |
| B | 28 | 30 | 28 | | |
| C | | | | | |
| DEGRADATION | | D1 | D2 | | ..D5 |
| A | | 0% | +11% | | |
| B | | -6% | +6% | | |
| C | | +7% | -7% | | |
| CD1 - CD5 | | +3% | +3.3% | | |

$X_{avg,3} =$
$S_3 =$

BPM PROBE

| OPERATION | RT1,i 10ms | RT2,i 12ms | RT3,i 11ms | ... | RT6,i |
|---|---|---|---|---|---|
| A | 18 | 17 | 18 | | |
| B | 28 | 50 | 28 | | |
| C | | | | | |
| DEGRADATION | | D1 | D2 | | ..D5 |
| A | | +20% | -8% | | |
| B | | -6% | +5% | | |
| C | | +7% | -7% | | |
| CD1 - CD5 | | +7% | -3.3% | | |

$X_{avg, BPM} = \ldots$
$S_{BPM} = \ldots$

*Fig. 3 cont.*

| TRIPLET NO. | RT. | RT₂ | RT₃ |
|---|---|---|---|
| 1 | RESPONSE VALUE 1 | RESPONSE VALUE 2 | RESPONSE VALUE 3 |
| 2 | RESPONSE VALUE 4 | RESPONSE VALUE 5 | RESPONSE VALUE 6 |
| 3 | RESPONSE VALUE 7 | RESPONSE VALUE 8 | RESPONSE VALUE 9 |
| 4 | RESPONSE VALUE 10 | RESPONSE VALUE 11 | RESPONSE VALUE 12 |
| 5 | RESPONSE VALUE 13 | RESPONSE VALUE 14 | RESPONSE VALUE 15 |
| 6 | RESPONSE VALUE 16 | RESPONSE VALUE 17 | RESPONSE VALUE 18 |

*Fig. 6*

```
/* SEE IF USER KNOWS THE TRANSACTION DEFINITION*/
IF (DOESUSERKNOW == TRUE)
        KNOWTRANSACTION():
ELSE
        UNKNOWNTRANSACTION():

/* FOR KNOWN TRANSACTIONS */
KNOWNTRANSACTION(){
        FOR (x=0:x=NUM_TRANSACTION:x++){
            /* IF A NEW DEFINITION */
            /* BRING UP DIALOG BOX FOR TRANSACTION
            DEFINITION   */
            DIALOGDEFINETRANSACTION(TRANSACTID);
        }

/* SET UP THE TIMER ROUTINE WHICH WILL RE-
        CALCULATE THE TRT's EACH INTERVAL */
        SETTIMERROUTINE(INTERVAL. RECALCULATETRT
        (TRANSACTLIST{}) );
}

DIALOGDEFINETRANSACTION(TRANSACTID){
            /* THIS DIALOG BOX ALLOWS THE USER TO
            DEFINE A TRANSACTION AS A SEQUENCE OF
            PRIMITIVE OPERATIONS */
            DEFINE TRANSACT(TRANSACTID);
            /* WHEN DONE THE USER SAVES THE
            DEFINITION INTO A DATABASE */
            SAVETRANSACTION(TRANSACTID);

/* FOR UNKNOWN TRANSACTIONS */
UNKNOWN TRANSACTION ( )

/* DEFINE THE NAME OF THE CLIENT WHICH WILL RUN THE
APPLICATION */
CLIENTNAME = SETCLIENTNAME ();

/* LOAD THE RECORDING TSR ONTO THE CLIENT */
LOADCMTTSR (DATAFILENAME, SERVERNAME);
/* EXECUTE THE APPLICATION ON THE CLIENT */
RUNAPPLICATION(CLIENT NAME, APPLICATIONNAME);
/* RETRIVE THE FILE SERVER PRIMITIVES ASSOCIATED WITH
THE APPLICATION FROM THE FILE PRODUCED BY THE TSR AND
DISPLAY IN A DIALOG BOX FOR THE USER TO EDIT */
RETRIVETSRPRIMITIVESUITE(SERVERNAME, DATAFILENAME,
CLIENTNAME.SUITE PTR);
/* DISPLAY THE SUITE OF SERVER PRIMITIVES IN THE TRACE OF
THE APPLICATION AND ALLOW THE USER TO EDIT,
IF DESIRED */
```

Fig. 7

```
DISPLAYTHEPRIMITIVESUITE0
/* RECORD THE DEFINED TRANSACTION INTO THE
TRANSACTION DATABASE */
RECORDTRANSACTIONS(NUM_TRANSACT,
TRANSACTION_NAMED {});

/* NOW TREAT THE DEFINED TRANSACTIONS AS KNOW
TRANSACTIONS */
/* SET UP THE TIMER ROUTINE WHICH WILL RE-CALCULATE THE
TRT's EACH INTERVAL */
SETTIMERROUTINE(INTERVAL, RECALCULATETRT(TRANSACT
LIST {}) );

/* THIS FUNCTION RE-CALCULATES THE TRT EACH INTERVAL */
RECALCULATETRT(TRANSACTLIST {}){
     FOR (x=0:x< RETURN_TRANSACTIONS:x + +){
          /* FOR EACH DEFINED TRANSACTION CALCULATE ITS
          TRT */
          TRT(x) = CALCULATETRT(TRANSACTIONID);
     }
}

CALCULATETRT(TRANSACTIONID){
     /* LOCATE TRANSACTION DEFINITION IN DATABASE */
     LOOKUPTRANSACTION(TRANSACTION ID.
     TRANSACTIONPTR);
     TRT = 0;
     FOR (x=0:x<TRANSACTIONID->NUM_PRIMITIVES;x + + ){
          /* GET THE AGGREGATE TRT FROM THE SUM OF THE
          AVERAGE RT's */
          TRT += TRANSACTIONID->RT(x);
     }

RETURN(TRT):
```

*Fig. 7 cont.*

SYSTEM TO FACILITATE EFFICIENT UTILIZATION OF NETWORK RESOURCES IN A COMPUTER NETWORK

FIELD OF THE INVENTION

The present invention relates to systems for monitoring and analyzing the performance of servers in a network and for suggesting an appropriate server to a client having a particular service request. More specifically, the present invention relates to such a system which evaluates a server's capability to service the particular client and service requested without requiring a broker to have any detailed information regarding the nature of the servers.

BACKGROUND OF THE INVENTION

In a computer network, a client (e.g. a processor or computer in the network) that wishes to obtain a particular service will generally have a wide range of available resources that are capable of performing the service. While this is advantageous, it also creates resource management problems, e.g., which one of these resources should the client utilize? It is known in the art to utilize a server, which is generally comprised of both hardware and software, as an interface between a client and a plurality of resources. In a given network, there may be a plurality of servers, each one of which is itself associated with a plurality of resources and is able to provide a plurality of services. Moreover, for any given service, there may be a plurality of available servers.

In order to facilitate efficient utilization of network resources, it is known in the art to use a "broker mechanism" to receive requests from clients for various services, and to suggest an appropriate server to satisfy the various requests. One known type of broker operates to assign an entire broker to a client without regard to the resources required by the client.

None of the prior art systems, however, take into account performance discrepancies across the network. For example, due to various performance delays (e.g. bridges, bus traffic, routing problems), a particular server may be able to service client "1" more quickly than client "2." Furthermore, a server may be able to perform one particular service more quickly than another. Moreover, a server's ability to more efficiently provide service to client "1" over client "2" may further depend upon the type of service being performed.

A system is needed which evaluates the performance of a server from the perspective of the client and suggests the server that is best suited to provide a particular client with a particular service at a particular time.

Moreover, since present day networks frequently include many different types of servers which may have vastly different physical characteristics, a system is required that can perform the above function without any detailed knowledge of the internal operation and design of the various servers.

SUMMARY OF THE INVENTION

The present invention provides a system for monitoring the performance of servers in a network and suggesting an appropriate server to a client with a particular service request. It performs an active analysis of each server's ability to provide various services to various clients, and utilizes this information to suggest an appropriate server to a client requesting a particular service. The present invention accomplishes these tasks without any detailed knowledge of the internal operation and design of the various servers. In accordance with the present invention, a Broker-Performance Mechanism is provided which is coupled between a plurality of clients and a plurality of servers.

The Broker-Performance Mechanism performs an active performance analysis of the servers across the network and utilizes this information to alert the system manager to server performance problems and to automatically suggest an appropriate server to a client requesting a particular service.

In order to perform an active performance analysis of the servers in the network, the Broker-Performance Mechanism sends probes to various clients which reside in various parts of the network. The greater the number of probes, the greater the accuracy of the analysis. The probes are small application programs that perform certain elementary functions on particular server(s) and measure the response times of the server(s) in response to commands from the Broker-Performance Mechanism. The Broker-Performance Mechanism can send a probe to a client by utilizing, for example, a Pathworks "Showserv" utility (a product of Digital Equipment Corporation). Alternatively, the probes can be manually installed in a client via the client's disk drive.

The probes are generally application programs which run in a client that is simultaneously performing its normal functions (e.g. running a Wordperfect™ word processing program). However, a probe could also be a dedicated hardware device capable of responding to the commands of the Broker-Performance Mechanism. In any case, since a probe is an application running in the client (or a device which simulates an application running in a client), the response time for a particular server is the actual response time that would be seen by an application in the client, i.e. the actual amount of time it would take to satisfy client requests.

The Broker-Performance Mechanism initially commands each probe to measure the response time at a period of extremely low network activity, e.g. midnight, to obtain baseline response values for one or more of the servers. The Broker-Performance Mechanism then periodically commands the probe to measure response times so that the Broker-Performance Mechanism can determine how each server's response has degraded or improved over time or during particular times of the day, week, month, etc.

In order to determine the level of performance of a particular server across the network, the Broker-Performance Mechanism will send out probes to clients located in various portions of the network and instruct the probes to perform various operations on the server. It should be stressed that since the performance evaluation is performed from the perspective of the client, it requires no detailed knowledge of the specifics of the server to be evaluated.

In an embodiment of the system according to the present invention, the data retrieved from the various probes are manipulated to indicate the performance of one or more servers across the entire network. Utilizing this information, a user can extrapolate server performance with respect to a particular client from the performance data retrieved from nearby probe sites. This, in turn, will aid the user in identifying problems in the network which are causing degradation of server performance in a particular region of the network (for example delays due to bridges or routing problems).

The probe data is also utilized to provide a brokering function. In accordance with the brokering function of the present invention, the Broker-Performance Mechanism utilizes the probe data to distribute service requests across the network in order to balance the load placed on the servers. When a client wishes to perform a particular application, it sends a request for a service to the Broker-Performance Mechanism. The Broker-Performance Mechanism maintains a list of servers and the services which they are able to perform. When a request for a particular service is received, the Broker-Performance Mechanism examines, for each server which is capable of performing the application requested, the performance data from the probe(s) in the same region of the network as the requesting client. Utilizing this information, the Broker-Performance Mechanism suggests the server which is best able to perform the particular service for the particular client.

Assume, e.g., that 4 servers (A–D) are in the network; only servers A–C are capable of interacting with client 1; and only servers A, B and D are capable of delivering service Beta. The Broker-Performance Mechanism will first eliminate servers C and D from consideration and then evaluate the probe data from servers A and B in order to determine which of these two is the optimal server for client 1. The probe data for the servers are organized by probe location. The Broker-Performance Mechanism makes its suggestion based upon the probe data from the region of the network in which the client resides. If there is no probe data from that region, the Broker-Performance Mechanism can use the probe data generated from its own position as the probe data. Utilizing this information, the Broker-Performance Mechanism will chose either server A or server B to provide application Beta to client 1.

BRIEF DESCRIPTION OF THE DRAWINGS

FIG. 2 shows an illustrative computer program for determining the average response time.

FIG. 3 is a table which illustrates an exemplary method of setting an alarm as a function of relative degradation values.

FIG. 6 is a table which illustrates response time triplets used in the graph of FIG. 5.

FIG. 7 shows an illustrative computer program for implementing a transaction simulation tracking function and an application simulation tracking function.

DETAILED DESCRIPTION

Figure 1:
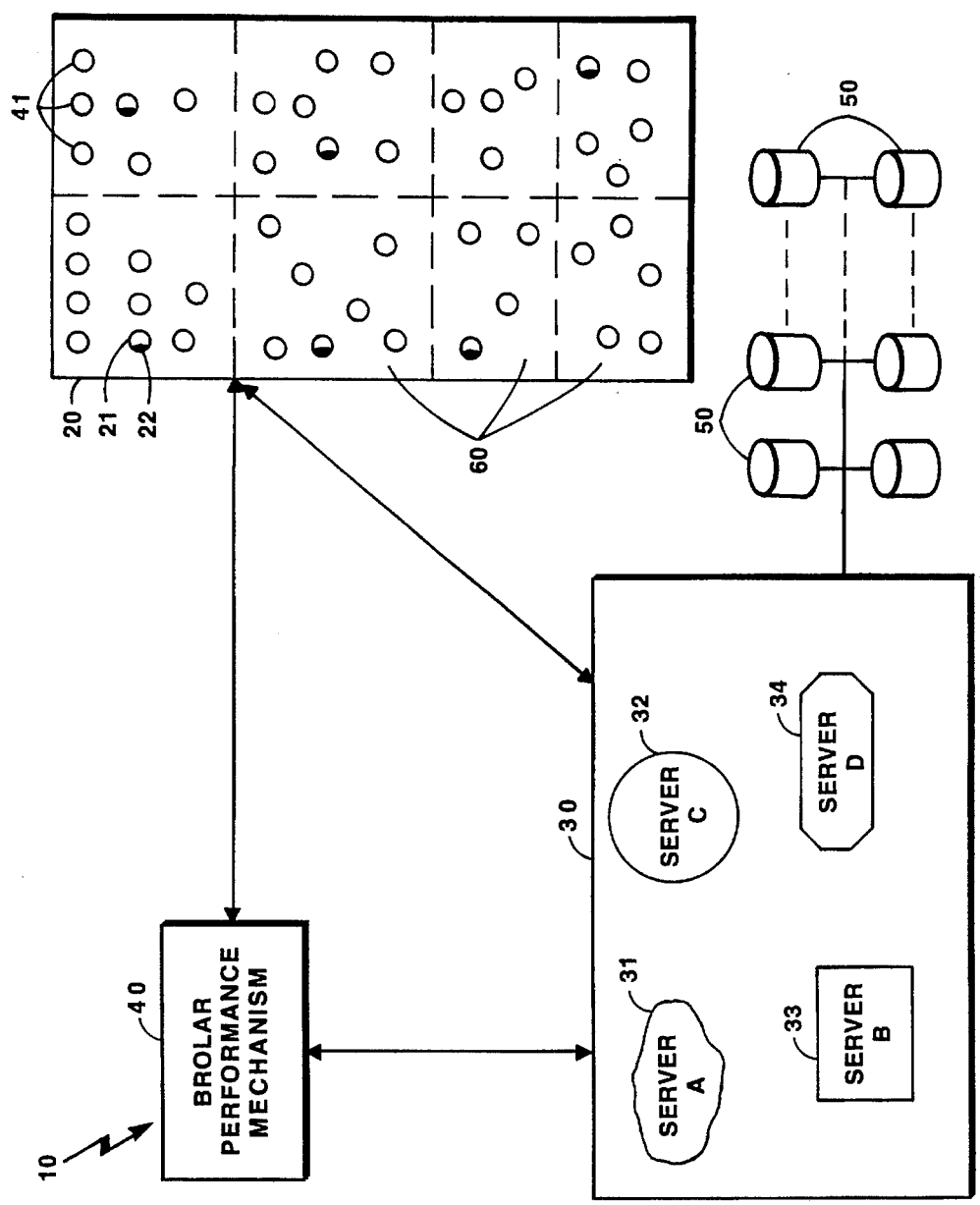
FIG. 1 is a block diagram of the system according to the present invention.

The system according to the present invention utilizes a Broker-Performance Mechanism and a plurality of probes to provide both a monitoring function and a brokering function. This system is illustrated in FIG. 1 which shows a network 10 having a client population 20, a server population 30, a plurality of resources 50, and a Broker-Performance Mechanism 40 (hereinafter "BPM"). The server population can be a heterogeneous mix of dissimilar servers 31–34. Each server 31–34 may be coupled to some or all of the resources 50. The only requirement is that each server 31–34 to be monitored and considered with regard to the brokering and/or monitoring function should be capable of communicating with the BPM 40. Similarly, the client population 20 can include dissimilar clients 21, so long as each client 21 availing itself of the brokering function is capable of communicating with the BPM 40. The clients 21 are located in various regions 60 of the network 10. Each server 31–34 need not be compatible with each client 21 in the client population 20. The manner in which the system provides the brokering and monitoring functions will now be described in detail.

A. The Brokering Function

Each client 21 in the client population 20 contains a distributed broker program (DBP) which allows the client 21 to utilize the broker service. In an illustrative embodiment of the present invention, the DBP is a Microsoft Windows application which communicates with the BPM 40 via a NetBios message protocol. It should be noted that NetBios is merely an example of an acceptable protocol. Any message protocol(s) or system of communication which allows server-BPM and client-BPM communication is acceptable. In any case, a user who wishes to utilize the brokering function initiates DBP from the main menu. DBP derives a unique NetBios name for the client from the client's hardware address. The user provides:

1) the name of the application which the user wishes to run; and 2) the preferred Network Operating System (NOS) types for server systems which the user is willing or able to use. This feature allows the user to define a set of permissible server types which is a subset of the set of server types which the client is capable of utilizing. In an alternative embodiment, the DBP provides a predetermined list of acceptable server types.

The DBP utilizes this information to encode a NetBios message which includes the unique address of the client, the requested application, and the list of acceptable server types. This message is transmitted over the network via NetBios to the BPM 40. After the message is sent, the DBP listens to the NetBios link for incoming messages from the Broker Performance Mechanism 40. In an illustrative embodiment of the invention, the DBP sets off a Windows timer of 3 seconds in duration and uses this interval to periodically listen for incoming messages. When a message is received from the BPM 40, the message is decoded by DBP and the suggested server(s) for the requested application are displayed to the user in order of predicted best performance.

The BPM contains a central broker program (CBP) and a performance data collection mechanism (PDCM). The PDCM provides the CBP with continually updated performance information regarding each server in the server population.

The performance information for each server is generated by a plurality of probes 22 which are located in certain clients 21 in the client population 20. The BPM 40 itself contains a BPM probe 41 which measures the performance of the servers from the perspective of the BPM 40. The PDCM commands some or all of the probes to periodically perform various server primitive operations on some or all of the servers. Examples of server primitive operations include sequential reads and writes of various sizes, random reads and writes of various sizes, file opens and closes, byte range locks, etc.

The PDCM calculates a performance index for each server in the system with respect to each probe in the system. Thus, assuming there are eight probes and four servers in a system comprising 100 clients, each of the four servers would have eight performance indices. The manner in which a performance index is obtained will now be discussed.

The performance index (PI) is calculated as the inverse of the average response time ($RT_{avg}$), i.e. $PI=1/RT_{avg}$. For example, assume the response time (RT) of server A to probe 1 for three server primitive operations ($O_1$, $O_2$, $O_3$) is as follows: $RT_1=36$ ms; $RT_2=12$ ms; and $RT_3=309$ ms. Further assume that the workload composition of server A for the three server primitive operations is as follows: $O_1=30\%$; $O_2=50\%$; and $O_3=20\%$. In accordance with an embodiment of the present invention, the PDCM calculates two different performance indices; a relative performance index and an absolute performance index which are derived from $RT_{rel\text{-}avg}$ and $RT_{abs\text{-}avg}$, respectively. $RT_{abs\text{-}avg}$ is derived with each server primitive operation carrying an equal weight while $RT_{rel\text{-}avg}$ is derived with each server primitive operation carrying a weight equal to its frequency of occurrence in the workload distribution. Applying this to the above cited example:

$RT_{abs\text{-}avg}(A,1) = \frac{1}{3}(RT_1) + \frac{1}{3}(RT_2) + \frac{1}{3}(RT_3)$
$= 12+4+103 = 119$ ms $PI_{abs}(A,1) = 1/RT_{abs\text{-}avg}(A,1) = 0.0084$ $RT_{rel\text{-}avg}(A,1) = 0.30(RT_1) + 0.50(RT_2) + 0.20(RT_3)$
$= 10.8+6+61.8 = 78.6$ ms $PI_{rel}(A,1) = 1/RT_{rel\text{-}avg}(A,1) = 0.0127$ The client user, system user, or system designer can choose whether an absolute or relative index should be used to generate the performance indices.

The performance indices from each probe are sent to the BPM 40 for processing. In the BPM 40, the CBP creates a data structure which contains a list of the servers in the system, the applications which they are able to perform, and the performance indices for each server with respect to each probe.

When the BPM 40 receives a message from a client requesting a server suggestion, the CBP determines which of the plurality of servers is capable of providing the service requested. The CBP then determines which of the plurality of probes is from the same network region 60 as the requesting client. If none of the probes is from the requesting client's region, the performance data from the BPM probe 41 is used. In any case, the relevant probe data for each of the acceptable servers is accessed. The BPM 40 then suggests the server with the highest performance index for the relevant probe.

In a further embodiment of the present invention, the CBP creates an ordered list of the acceptable servers and provides the client with the top five performing servers in order of descending performance.

It should be understood that since the PDCM receives the individual response times for each server primitive operation, a performance index could be generated with respect to each individual server primitive operation. Since certain applications may be sensitive to degradations in particular server primitive operations, the BPM 40 could suggest an appropriate server based upon the performance index of particular server primitive operation(s). For example, if client 1 requests application A and application A is known to consist primarily of block read operations, the BPM 40 could suggest the server which has the highest performance index with respect to block read server primitive(s).

The manner in which the probes gather the performance information will now be discussed in more detail. In an illustrative embodiment of the invention, a probe 22 comprises a response time monitoring program (RTMP) running in a client 21. The RTMP is an application level program in the client. A similar program implements the BPM probe 41. The RTMP performs certain server primitive operations on selected servers, measures the response time of the servers, and transmits the information to the PDCM in the BPM 40 for processing. The BPM 40 designates 1) which server primitive operations are to be performed; 2) on which servers these server primitive operations are to be performed; and 3) the frequency with which the operations are to be performed. Since the RTMP is an application level program, the response time measured is equal to the response time which would actually be seen by a client performing a normal application.

Since the response time for a server primitive operation is generally faster than the running time of a high level instruction (e.g. a C-language instruction), the RTMP measures the response time for a plurality of sequentially performed server primitive operations. For a particular server primitive operation O, a "bunch" is represented as a number "n" and a small sample size is represented as "s". In an illustrative embodiment of the present invention, n=20 and s=5. RTMP will perform "s" sets of "n" transactions of server primitive operation "O" and measure the total response time, $RT_t(O)$, using C run-time library functions. The average response time for operation O ($RT_{avg}(O)$) is then $RT_t/n$.

FIG. 2 shows a generalized computer program to determine the average response time. Referring to FIG. 2, procedure Get_Response_Time_"O" waits a random period of time and then calls procedure Bunch_of_"O". Procedure Bunch_of_"O" stores a timestamp1; performs the server primitive operation "O" n times; and then stores a timestamp2. It then returns the total response time (time=timestamp2—timestamp1) to the procedure Get_Response_Time. Procedure Get_Response_Time stores the response time and repeats the entire procedure s times to form a set of s response times for operation "O". Utilizing standard small sample statistical techniques, these values are used to report a metric for the average, median, variance, and 95% confidence interval of "O", and this information is transmitted to the PDCM in the BPM 40 for processing. This procedure is repeated for all server primitive operations and servers which are of interest. In accordance with the present invention, the periodic probing of servers in the network continues indefinitely or until explicitly terminated by the user.

B. The Monitoring Function

The monitoring function of the present invention also utilizes the performance information generated by the probes and the performance indices generated by the CBP and the PDCM. In accordance with the monitoring function, however, this information is used to alert the system manager of potential problems in the network.

As explained earlier, the probes are positioned in various locations in the network. The probes may, for instance, be positioned by "department." For example, a network might provide services to various departments in a company. Therefore, there may be a first probe in one of several clients in the accounting department, a second probe in one of several clients in the engineering department, and so on. The data from the probes can therefore be used to determine the performance degradation of a server across the network. For example, due to routing or bridging problems, the performance of a server with respect to a probe in the accounting department might be inferior to the performance of the same server with respect to a probe in the engineering department.

In accordance with the monitoring function, each probe in the network applies the same set of server primitive operations to each server in the network. Baseline performance values for each server with respect to each probe are measured at a period of extremely low network activity (e.g. Midnight). The BPM 40 then instructs the probes to periodically measure response time information for various server primitives such as the average, median, variance, and 95% confidence interval response time. When the BPM 40 receives the response time information from a particular probe for a particular server, it compares this current response time information with the baseline response time information and that same probes prior response time information to determine by how much, if at all, the server's performance has degraded, first, since the baseline value was recorded (baseline degradation) and, second, since the previous recorded value (relative degradation). This same process is repeated for each of the probes with respect to each of the servers. Therefore, if there are 3 servers and 6 probes, the BPM 40 will have, for each of the 3 servers, 6 baseline degradation values and 6 relative degradation values, i.e., one for each of the probes.

The baseline degradation values can be used to simply indicate to the system manager whether any of the three servers are overloaded. For example, the system manager could define an unreasonable baseline degradation as any such degradation value exceeding 60%, and set an alarm when that value is exceeded by any server as measured by any of the probes.

The relative degradation values are used to alert the system manager (or other user) to potential problems in the network relating to the connection paths from client to server. If, for any of the 3 servers, one of the six relative degradation values disproportionately exceeds the others, an alarm is sent to the system manager indicating that there may be some problem regarding the connection to the region of the network in which the probe which exhibited the abnormal degradation value is located. In an exemplary embodiment, the system triggers an alarm as a function of a comparison of degradation values, rather than merely as a function of an increase in response time for a single probe, because the response time of a server will vary according to the server's workload. When the response time degrades, over a single time period, more quickly with regard to one probe than the others, a problem in the server-client paths is indicated.

In an exemplary embodiment of the present invention, each probe's relative degradation values are compared with the relative degradation values of the BPM probe utilizing a two tailed test at 0.05 level of significance with a Student's t Distribution. Referring to FIG. 3, six response time values ($RT_1$–$RT_6$) are measures with respect to each of three server primitive operations (A, B, C) for each of three probes (1, 2, 3) and the BPM probe. Each of the probes takes its measurements from the same server at approximately the same time. Thus, the mmeasurement of $RT_{1,a}$ for probe 1 occurred within a few minutes of the measurement of $RT_{1,a}$ for probes 2, 3 and the BPM probe. From the six response time values for each of the three server primitive operations for each probe, five relative degradation values ($D_1$–$D_5$) are obtained for each of the three server primitive operations with respect to each probe.

The degradation values for each probe are averaged to form a set of five composite degradation values: $Cd_1$–$Cd_5$. From the five composite degradation values, $Cd_1$–$Cd_5$ for each probe, an average degradation value ($X_{avg,i}$) and a standard deviation ($S_i$) is obtained for each probe. Utilizing a two-tailed test at 0.05 level of significance with a Student's t Distribution, the degradation in performance for each of probes 1–3 is compared to the degradation of performance of the BPM probe (using the above-mentioned average degradation values and standard deviations) to determine if any of the probes are exhibiting performance degradations which are significantly different from the performance degradations of the BPM probe. If a probe is exhibiting performance degradations which are significantly different than the BPM probe, the system sets an alarm which indicates that there may be a problem in the path between the probe and the server tested.

Figure 4:
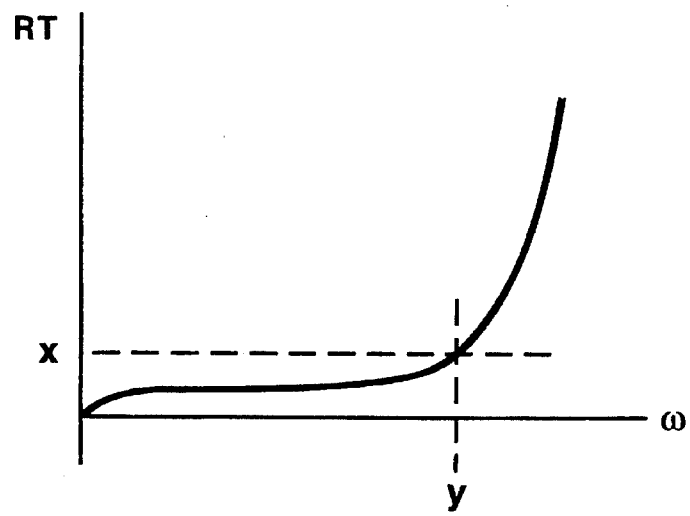
FIG. 4 is a graph which illustrates the manner in which a server's performance varies with its workload.

Another feature of the present invention sets an alarm for the central user or system manager when the response time of a server, considered as a whole, indicates that the server is approaching saturation behavior, i.e. a suddenly decreasing level of performance. This feature will be explained with reference to FIGS. 4 and 5. The manner in which a server's performance varies with its workload is shown in FIG. 4. With regard to any server, there exists a point x,y after which the response time of the server begins to increase suddenly as the workload increases. This point is sometimes referred to as the "knee" of the curve. For obvious reasons, this is a very undesirable condition. Saturation behavior by a server can be counteracted by altering the workload or server parameters to move the server's performance back into an area of linear behavior. An even more advantageous solution is to determine when a server is approaching saturation behavior and alert the central user or system manager to the problem so that corrective measures can be taken before the server enters the saturation region.

An exemplary method of determining the "knee" or saturation point of the curve of FIG. 4 will now be illustrated. The workload of the server is varied and the corresponding response times are calculated to form n workload/response time pairs (($W_1$, $RT_1$) through ($W_n$, $RT_n$)) which can be plotted on the graph of FIG. 4. The knee of the curve (point x,y) is calculated as follows:

1) calculate an average slope: $m_{avg} = (W_n - W_1)/(RT_n - RT_1)$;

2) calculate n-2 local slopes, $m_2 - m_{n-1}$, where $m_2 = (W_3 - W_1)/(RT_3 - RT_1)$ and $m_{n-1} = (W_n - W_{n-2})/(RT_n - RT_{n-2})$ The knee (or saturation point) of the curve is the particular one of the n points, x, which satisfies each of the following conditions $m_x = m_{avg +/- } 5\%$; $m_{x-1} <= m_{avg}$; and $m_{x+1} > m_{avg}$.

In accordance with the present invention, a single probe is chosen (generally the BPM probe 41 shown in FIG. 1) and probe data with regard to a server is obtained as described previously. The BPM 40 determines when a server is approaching saturation behavior by examining "triplets" of measured response times ($RT_1$, $RT_2$, $RT_3$), i.e. three consecutive response times, from the probe. A response time saturation value $RT_{sat}$ is defined as the response time at which the server begins to exhibit saturation behavior. As described above, $RT_{sat}$ can be determined for any given server by utilizing the probes to artificially alter the server's workload and measuring the resulting response time to determine the point at which the server's performance begins to exhibit saturation behavior. Alternatively, $RT_{sat}$ can be defined as any response time which the system manager or central user determines to be a maximum permissible value.

Figure 5:
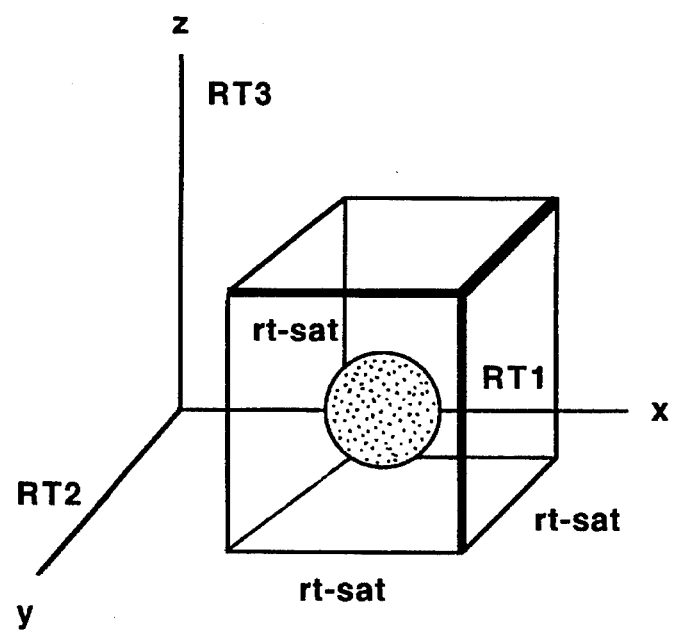
FIG. 5 is a graph which illustrates a server saturation alarm system of the present invention.

Referring to FIG. 5, there is shown a graph with $RT_1$, $RT_2$, and $RT_3$ as the x, y, and z axes, respectively. Each sequential set of 3 response time values creates a triplet as shown in FIG. 6. Each triplet forms a single point on the graph. The maximum permissible response time forms a cube with the length of the sides being equal to $RT_{sat}$, as shown. It has been empirically determined that the set of triplets measured over time will typically be bounded by a sphere of radius $r_b$. The center of the sphere (which also defines the center of the cube) can be determined, for example, by computing the arithmetic mean of the triplet values calculated over a period of time. The radius, $r_b$, can then be defined as the distance from the most recent triplet value (or from the average position of a set of recent triplet values) to the center of the sphere. In accordance with the present invention, the rate at which the sphere is approaching the cube is identified and reported as the rate at which the server is approaching saturation behavior. As a result, the BPM 40 can set an alarm indicating that the server is approaching saturation behavior when this rate exceeds a certain threshold. The BPM 40 will also set an alarm when the sphere intersects the cube to indicate when the server has entered the saturation region. The above described process is performed with respect to each server thereby forming a separate graph and triggering a separate alarm for each server.

Another feature of the present invention allows a central user, system manager, or client user to perform transaction simulation tracking and application simulation tracking.

In accordance with the transaction simulation tracking function, the user can simulate the performance of multiple user defined transactions over time. For example, a user may know that his particular application has specific performance critical transactions. It is therefore advantageous for the user to determine how efficiently various servers in the network respond to these transactions without actually installing the application on the network.

The BPM 40 can provide this service because it is continually measuring application level responses for server primitives. Assume, for example, that the user defines the following transaction for simulation: file open, lock 100 bytes, read 10 bytes @ offset x, write 50 bytes @ offset y, unlock 100 bytes, close file. Since the BPM 40 is continually compiling response times for these server primitive operations in conjunction with its other functions, the BPM 40 can tabulate baseline response time information regarding this transaction from the baseline values for the relevant server primitive operations. The simulated performance of this critical transaction can then be tracked over time without ever installing the application on the network by utilizing the data retrieved by the probes for use in the BPM's other functions.

A similar procedure can be used even if the user is unable to identify the critical transactions of the application. In this situation, the BPM 40 will identify the sequence of server primitive operations generated by the application for the user. In accordance with this feature of the present invention, the BPM 40 utilizes a DOS Terminate and Stay Resident (TSR) component which loads itself into memory and passively hooks onto the DOS INT 21 through which all client-server exchanges must pass. The actual application is then run only once with the TSR component in the background. Utilizing the information detected by the TSR, the BPM 40 identifies and tabulates the sequence of client server primitive exchanges contained in the application. Once the sequence of server primitives has been determined, the BPM 40 tracks the simulated performance of this sequence of transactions (and hence, the performance of the application) over time, as described above with reference to the transaction simulation.

Figure 7A:
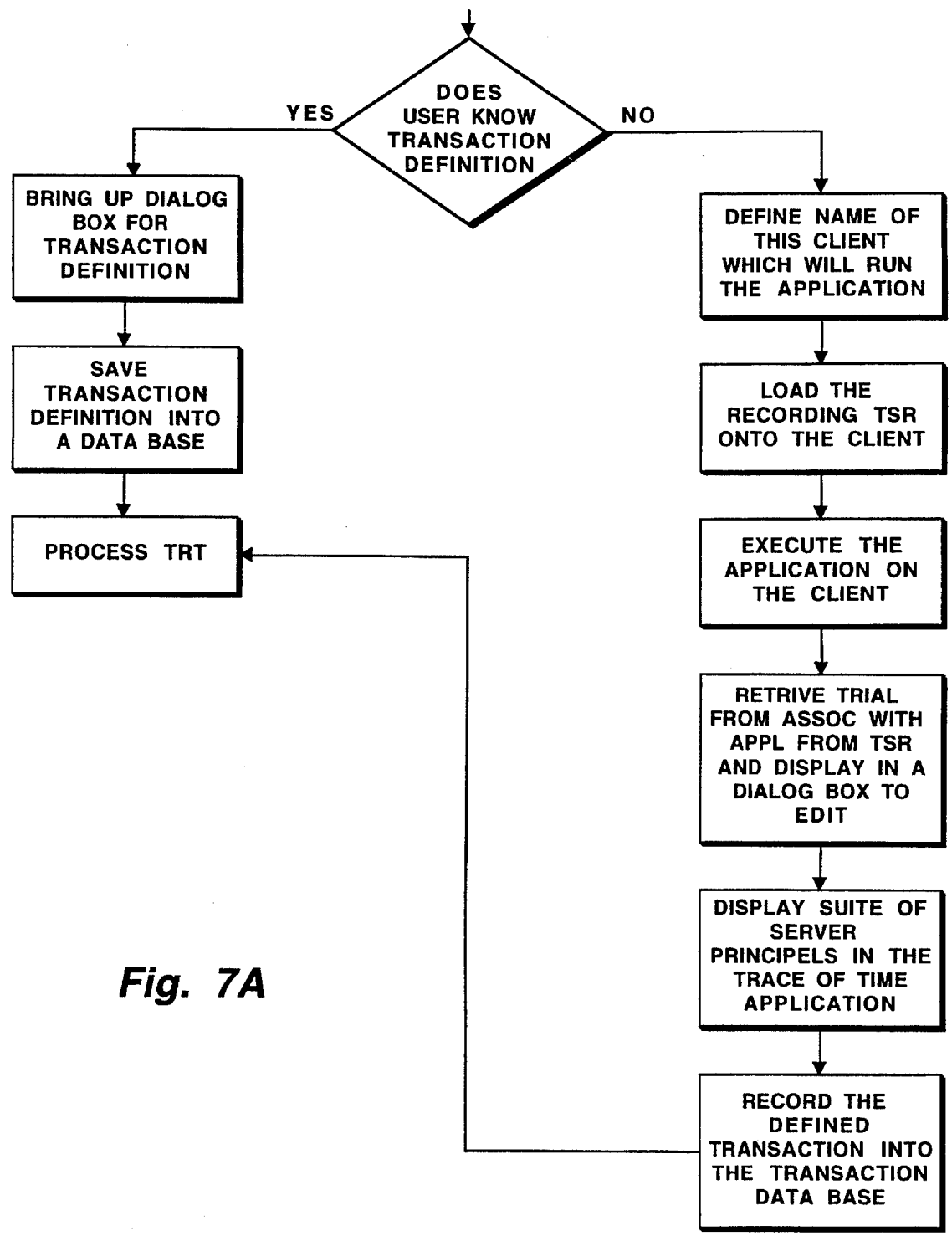
FIG. 7A is a flow chart of the illustrative computer program of FIG. 7.

FIG. 7 shows an illustrative computer program for implementing the transaction simulation tracking function and the application simulation tracking function and FIG. 7A is a flow chart of the illustrative computer program of FIG. 7. The program initially determines whether the user knows critical transactions of interest.

If the user knows the critical transactions, function KnownTransaction is called. The user is then prompted to define a transaction as a sequence of server primitive operations (DialogDefineTransaction(transactID)). The user may create one or more transactions. These transactions are saved in TransactList, and then procedure SetTimerRoutine is called which periodically calculates the total transaction response time for each transaction by performing procedure RecalculateTRT at regular intervals. Procedure RecalculateTRT calculates a total transaction time for each transaction by calling procedure CalculateTRT and storing the total transaction time as TRT[x]. Procedure CalculateTRT locates the user defined transaction in the database (LookUpTransaction) which stores the response time values which are continually gathered for the brokering and monitoring functions. For each server primitive operation defined, the corresponding average response time in the Broker-Performance Mechanism is retrieved. These average response times are summed to form a total response time for each transaction.

If the user does not know the relevant critical transactions, procedure UnknownTransaction is called. The user must first identify the client which will run the application (ClientName). The TSR component is then loaded into the client (LoadCMTTSR) and the application to be simulated and tracked is then run once on the client (RunApplication(ClientName, ApplicationName)) to generate a list of server primitive operations for the application. The TSR component produces a file (RetreivePrimitiveSuite) which contains a list of the server primitive operations associated with the application. This list is displayed to the user (DisplayThePrimitiveSuite) to allow the user the option of editing the list to form one or more smaller lists of server primitive operations. The resulting list (or set of lists) is then saved as a transaction(s), and procedure SetTimerRoutine is called (as described above) to periodically calculate the response times for the transaction(s).

It should be understood that since the transaction and application simulations merely create, in effect, a user defined server primitive operation with a corresponding set of response time values, all of the performance degradation analyses previously discussed can also be implemented with the simulated data.

What is claimed is:

1. In a network including at least one client and at least one server, a method for monitoring a performance degradation of the at least one server, comprising the steps of:

(a) providing at least one probe in the network;

(b) operating the at least one probe to determine a baseline performance value for the at least one server by transmitting a request to the at least one server and measuring a response time for the at least one server at a period of low network activity;

(c) transmitting the baseline performance value to a monitoring device;

(d) operating the at least one probe to transmit a request to the at least one server and to measure a response time for the at least one server to determine a current performance value of the at least one server;

(e) transmitting the current performance value to the monitoring device;

(f) repeating steps (d) and (e) periodically at a preselected rate to form a set of current performance values; and (g) determining, in the monitoring device, a degradation in performance of the at least one server as a function of the base line performance value and the set of current performance values.

2. The method of claim 1, further comprising the step of setting an alarm when the determined degradation in performance of the at least one server exceeds a predetermined value.

3. The method of claim 1, wherein the step of providing at least one probe includes the step of sending an application program from the monitoring device to the at least one client, the application program performing preselected network functions in response to commands from the monitoring device.

4. The method of claim 1, wherein the at least one probe performs a sequence of server primitive operations, the sequence of server primitive operations corresponding to a sequence of critical server transactions extracted from a user-defined application.

5. The method of claim 4, wherein the user-defined application is provided to the monitoring device and the monitoring device extracts the sequence of critical server transactions from the user-defined application and creates the corresponding sequence of server primitive operations.

6. In a network including a plurality of clients and a plurality of servers, each one of the plurality of servers capable of providing at least one of a plurality of services, a method for suggesting an appropriate one of the plurality of servers to a one of the plurality of clients requesting one of the plurality of services, comprising the steps of:

(a) providing a plurality of probes located in selected parts of the network;

(b) providing a service list in a Broker-Monitor device which includes information indicating, for each of the plurality of servers, which of the plurality of services are available;

(c) operating at least two of the plurality of probes to transmit a probe request to each of the plurality of servers and to measure at least one response time for each of the plurality of servers;

(d) transmitting the response times to the Broker-Monitor device;

(e) receiving, in the Broker-Monitor device, a client request for a selected one of the plurality of services from one of the plurality of clients;

(f) determining, from the service list, a subset of the plurality of servers which are available to provide the selected one of the plurality of services;

(g) analyzing the response times in the Broker-Monitor device to determine, for each server in the subset of the plurality of servers, a performance level with respect to each of the at least two probes; and (h) suggesting a server from the subset of the plurality of servers to the one of the plurality of clients as a function of the performance levels of the servers.

7. The method of claim 6, wherein the step of providing a plurality of probes includes the step of sending an application program from the Broker-Monitor device to certain ones of the plurality of clients, the application program performing preselected network functions in response to commands from the Broker-Monitor device.

8. In a network including a plurality of clients and a plurality of servers, each one of the plurality of servers capable of providing at least one of a plurality of services, a system for suggesting an appropriate one of the plurality of servers to one of the plurality of clients requesting one of the plurality of services, comprising:

a plurality of probes located in selected parts of the network;

a Broker-Monitor device coupled to the plurality of servers, to the plurality of clients, and to the plurality of probes;

the Broker-Monitor device generating a service list which includes information indicating, for each of the plurality of servers, which of the plurality of services are available;

each of the plurality of probes operating to transmit a probe request to each of the plurality of servers and to measure at least one response time for each of the plurality of servers, each of the plurality of probes transmitting the response times to the Broker-Monitor device;

the Broker-Monitor device receiving a client request for a selected one of the plurality of services from a certain one of the plurality of clients, the Broker-Monitor device determining, from the service list, a subset of the plurality of servers which are available to provide the selected one of the plurality of services;

the Broker-Monitor device analyzing the response times in the Broker-Monitor device to determine, for each of the subset of the plurality of servers, a performance level for each server with respect to the each of the plurality of probes; and the Broker-Monitor device suggesting one of the subset of the plurality of servers to the certain one of the plurality of clients as a function of the performance levels of the servers.

9. The system of claim 8, wherein each of the plurality of probes is an application program resident in a respective one of the plurality of clients in the network, and wherein the respective one of the plurality of clients performs preselected network functions in response to commands from the Broker-Monitor device.

10. In a network including at least two clients and at least one server, a method for monitoring a performance of the at least one server across the network, comprising the steps of:

(a) providing at least two probes at various locations in the network;

(b) operating the at least two probes to transmit a request to the at least one server to measure a response time for the at least one server, wherein each of the at least two probes performs a sequence of server primitive operations, the sequence of server primitive operations corresponding to a sequence of critical server transactions extracted from a user-defined application, wherein the user-defined application is provided to the monitoring device and the monitoring device extracts the sequence of critical server transactions from the user defined application and creates the corresponding sequence of server primitive operations; and (c) analyzing the response times to determine the performance of the at least one server.

11. A method for determining when a server in a network is approaching saturation, comprising the steps of:

(a) providing a probe in one of a plurality of clients in the network;

(b) operating the probe to periodically transmit a request to the server and measure a response time for the server in order to determine a set of three consecutive current response time values;

(c) plotting the set of three consecutive current response time values as a single location on a three dimensional graph;

(d) repeating steps (b) and (c) at selected time intervals to form a sphere of radius r, the sphere having a center at a position c on the graph;

(e) plotting a cube on the three dimensional graph, the cube having a center at the position c on the graph, a length of a side of the cube being equal to a predetermined saturation response time; and (f) determining a rate at which the server is approaching saturation as a function of the rate at which the sphere is approaching a side of the cube.

* * * * *